US008558827B2

(12) United States Patent
Lee

(10) Patent No.: US 8,558,827 B2

(45) Date of Patent: Oct. 15, 2013

(54) DATA DRIVING CIRCUIT, DISPLAY APPARATUS, AND DATA DRIVING METHOD WITH RECEPTION SIGNAL

(75) Inventor: Yong Jae Lee, Yongin-si (KR)

(73) Assignee: Anapass, Inc., Seoul (KR)

( * ) Notice: Subject to any disclaimer, the term of this patent is extended or adjusted under 35 U.S.C. 154(b) by 419 days.

(21) Appl. No.: 12/654,354

(22) Filed: Dec. 17, 2009

(65) Prior Publication Data

US 2010/0156882 A1 Jun. 24, 2010

(30) Foreign Application Priority Data

Dec. 18, 2008 (KR) ........................ 10-2008-0129448

(51) Int. Cl.
*G06F 3/038* (2013.01)
*G09G 5/00* (2006.01)

(52) U.S. Cl.
USPC .............................................. 345/213; 345/98

(58) Field of Classification Search
USPC ............................................ 345/98, 100, 213
See application file for complete search history.

(56) References Cited

U.S. PATENT DOCUMENTS

| | | | | |
|---|---|---|---|---|
| 7,180,497 | B2 | 2/2007 | Lee et al. | |
| 2006/0262065 | A1 * | 11/2006 | Luo et al. | 345/98 |
| 2008/0007508 | A1 * | 1/2008 | Yoneyama | 345/100 |
| 2008/0074378 | A1 * | 3/2008 | Chuang | 345/98 |
| 2009/0046050 | A1 * | 2/2009 | Morita | 345/100 |

FOREIGN PATENT DOCUMENTS

KR 2003-0061553 7/2003

* cited by examiner

*Primary Examiner* — Kwang-Su Yang
(74) *Attorney, Agent, or Firm* — Oliff & Berridge, PLC

(57) ABSTRACT

Provided are a data driving circuit, a display device, and a data driving method. The data driving circuit includes a clock generator configured to generate a clock signal from clock information included in a reception signal including the clock information, mode information and a body, a sampler configured to sample the reception signal according to the clock signal to obtain the mode information and the body that includes at least one of control information and data, a signal controller configured to determine whether or not the body corresponds to the control information with reference to the mode information, and generate a control signal corresponding to the control information according to a result of the determination, and a data driver configured to generate a data signal corresponding to the data according to the control signal.

9 Claims, 6 Drawing Sheets

DATA DRIVING CIRCUIT, DISPLAY APPARATUS, AND DATA DRIVING METHOD WITH RECEPTION SIGNAL

TECHNICAL FIELD

The described technology relates generally to a data driving circuit, a display device, and a data driving method, and more particularly, to a data driving circuit receiving a reception signal including clock information, control information and data, a display device having the data driving circuit, and a data driving method.

BACKGROUND

In general, a timing controller generates a clock signal, a control signal and a data signal for driving a data driving circuit using video data and a synchronization signal input from an external video card, and supplies the generated signals to the data driving circuit.

The data driving circuit operates according to the clock signal and the control signal transferred from the timing controller, and applies an analog data signal corresponding to the data signal to a display panel. The timing controller and the data driving circuit are connected through a clock line, a control line and a data line that can transfer the clock signal, the control signal and the data signal, respectively.

SUMMARY

Embodiments provide a data driving circuit, a display device and a data driving method that generate a clock signal and a control signal from a reception signal including clock information, control information and data to process the data and do not require a line for transferring the control signal or the clock signal to the data driving circuit.

In one embodiment, a data driving circuit is provided. The data driving circuit includes: a clock generator configured to generate a clock signal from clock information included in a reception signal including the clock information, mode information and a body; a sampler configured to sample the reception signal according to the clock signal to obtain the mode information and the body that includes at least one of control information and data; a signal controller configured to determine whether or not the body corresponds to the control information with reference to the mode information, and generate a control signal corresponding to the control information according to a result of the determination; and a data driver configured to generate a data signal corresponding to the data according to the control signal.

In another embodiment, a data driving method is provided. The data driving method includes: generating a clock signal from clock information included in a reception signal including the clock information, mode information and a body; sampling the reception signal according to the clock signal and obtaining the mode information and the body that includes at least one of control information and data; determining whether or not the body corresponds to the control information with reference to the mode information; generating a control signal corresponding to the control information according to a result of the determination; and generating a data signal corresponding to the data according to the control signal.

In still another embodiment, a display device is provided. The display device includes: a timing controller configured to generate a reception signal including a body and mode information, the mode information indicating whether the body includes control information or data; a data driving circuit configured to generate a control signal corresponding to the control information included in the reception signal with reference to the mode information included in the reception signal, and generate a data signal corresponding to the data included in the reception signal according to the control signal; and a display panel configure to display an image corresponding to the data signal.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

The above and other features and advantages of the present disclosure will become more apparent to those of ordinary skill in the art by describing in detail example embodiments thereof with reference to the attached drawings in which.

DETAILED DESCRIPTION

It will be readily understood that the components of the present disclosure, as generally described and illustrated in the Figures herein, could be arranged and designed in a wide variety of different configurations. Thus, the following more detailed description of the embodiments of device and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout. Moreover, the drawings are not necessarily to scale, and the size and relative sizes of layers and regions may have been exaggerated for clarity.

Figure 1:
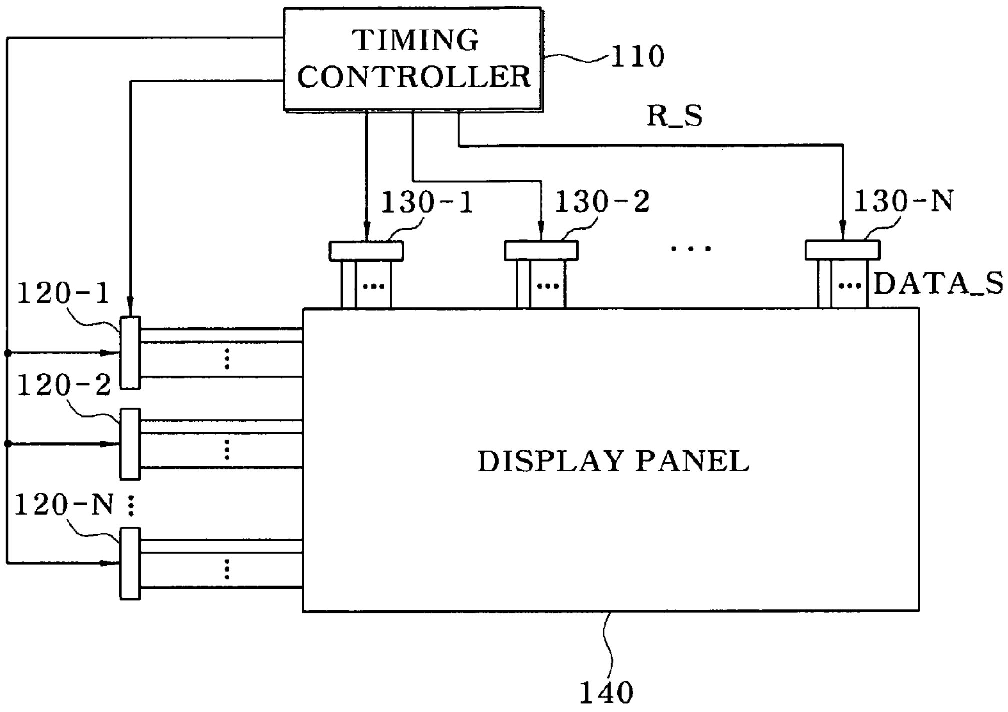
FIG. 1 is a block diagram of a display device according to an embodiment of the present disclosure.
Figure 2:
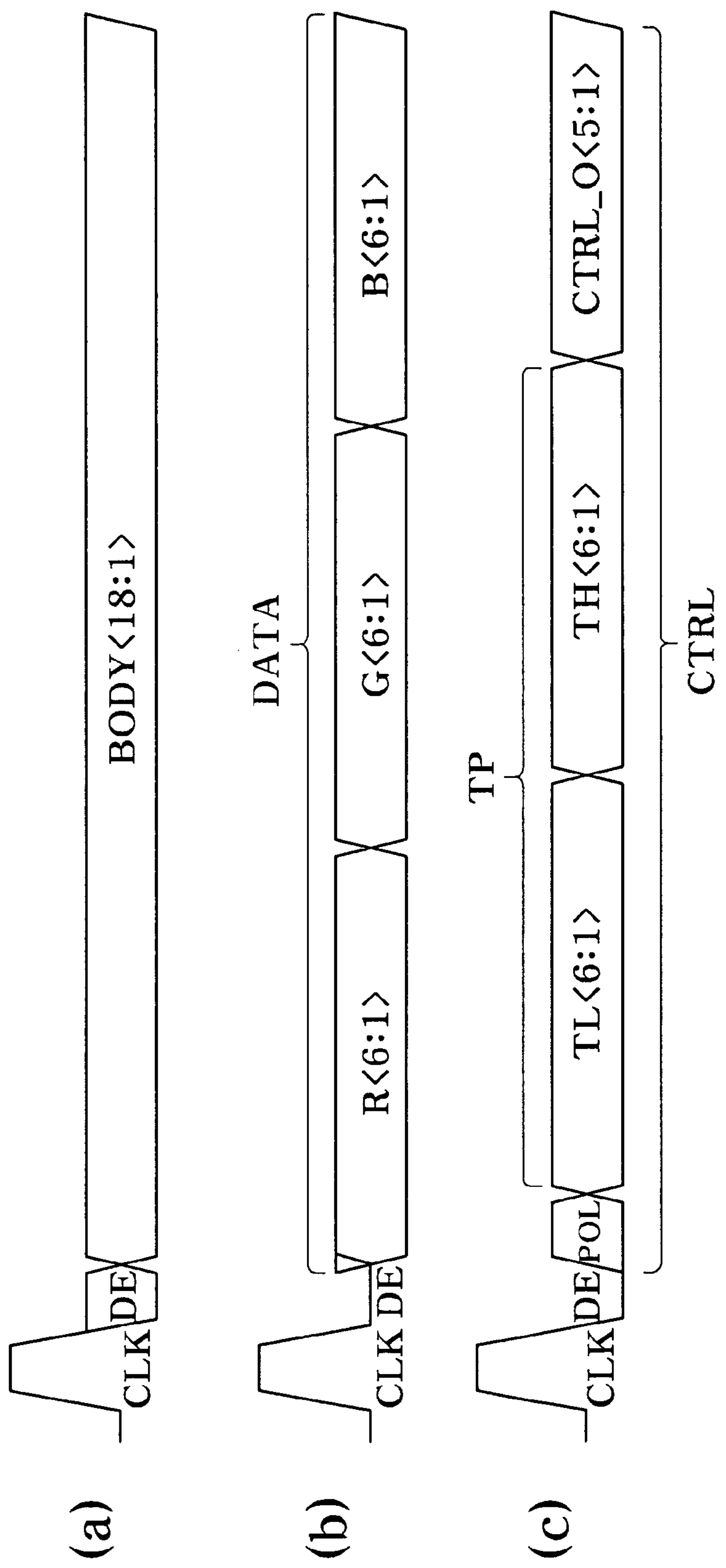
FIG. 2 illustrates examples of a transmission signal generated by a timing controller shown in FIG. 1.

FIG. 1 is a block diagram of a display device according to an embodiment of the present disclosure, and FIG. 2 illustrates examples of a transmission signal generated by a timing controller 110 shown in FIG. 1. Referring to FIG. 1, the display device includes the timing controller 110, gate driving integrated circuits (ICs) 120-1, 120-2, . . . , 120-N, data driving ICs 130-1, 130-2, . . . , 130-N, and a display panel 140.

The timing controller 110 generates a transmission signal including clock information, mode information, control information and data using video data and a synchronization signal input from an external video card, and applies the generated transmission signal to the data driving ICs 130-1 to 130-N. As an example, the timing controller 110 generates a transmission signal in which clock information CLK is embedded with a different signal magnitude than mode information DE and a body BODY as shown in FIG. 2(A). Here, the body BODY corresponds to the transmission signal excluding the clock information CLK and the mode information DE, and may be control information or data. FIG. 2(B) shows an example of a transmission signal including data DATA. The transmission signal includes mode information DE having a value "1," and the data DATA having 6-bit red (R) data R<6:1>, 6-bit green (G) data G<6:1> and 6-bit blue (B) data B<6:1>. FIG. 2(C) shows an example of a transmission signal including control information CTRL. The transmission signal includes mode information DE having a value "0," and control information CTRL including 1-bit polarity signal information POL, 12-bit load signal information TP (TL<6:1> and TH<6:1>) and 5-bit other control signal information CTRL_O<5:1>. The timing controller 110 generates and applies a gate control signal to the gate driving ICs 120-1 to 120-N. As another example, the timing controller 110 may generate a transmission signal having clock information by generating a transmission signal having a periodic transition.

The gate driving ICs 120-1 to 120-N supply scan signals to respective gate lines of the display panel 140 in sequence according to the gate control signal applied from the timing controller 110. Thus, the gate lines of the display panel 140 are activated in sequence, and thin film transistors (TFTs) respectively connected with the gate lines are turned on, so that signals can pass through the TFTs. Data signals supplied from the data driving ICs 130-1 to 130-N can be supplied to pixel electrodes via TFTs connected with activated gate lines.

The data driving ICs 130-1 to 130-N sample the mode information DE, the control information CTRL, and the data DATA using clock information CLK included the transmission signal (referred to as a reception signal R_S) applied from the timing controller 110. The data driving ICs 130-1 to 130-N determine whether the reception signal R_S includes data DATA or control information CTRL with reference to the mode information DE, generate control signals corresponding to the control information CTRL and data signals corresponding to the data DATA, and supply the generated data signals to respective data lines of the display panel 140. For example, when the reception signal R_S shown in FIG. 2(A) is received, the data driving circuit 130 may determine whether the reception signal R_S includes data DATA as shown in FIG. 2(B) or control information CTRL as shown in FIG. 2(C) with reference to the mode information DE. In FIG. 2(A), mode information DE is disposed directly behind clock information CLK, but the position of mode information DE may vary.

The display panel 140 receives the scan signals through the gate lines and the data signals through the data lines, and displays an image according to the signals. For example, the display panel 140 is a liquid crystal display (LCD) panel, plasma display panel (PDP), or organic light-emitting diode (OLED) panel.

Figure 3:
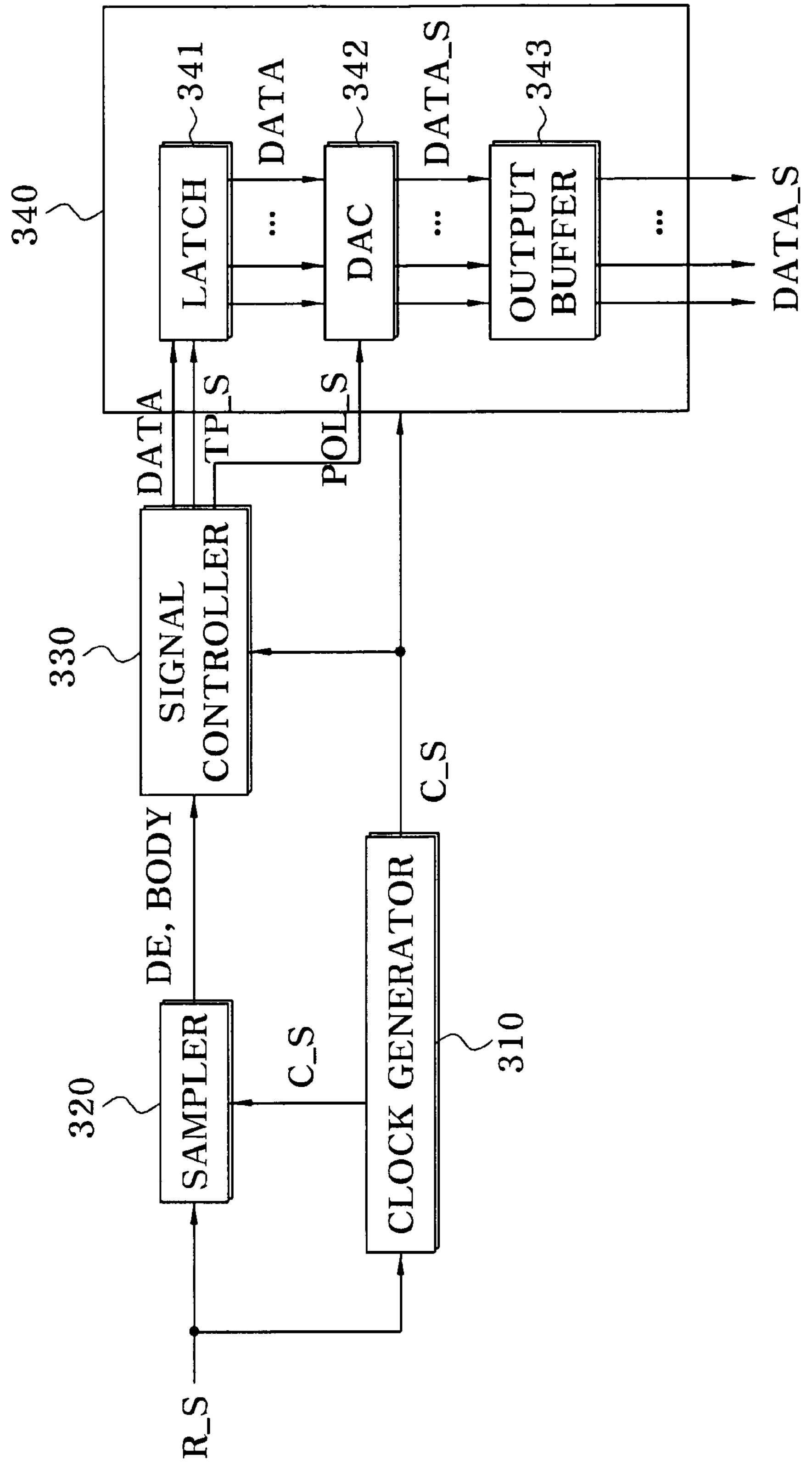
FIG. 3 is a block diagram of an example of a data driving integrated circuit (IC) shown in FIG. 1.

FIG. 3 is a block diagram of an example of the data driving IC 130-1 shown in FIG. 1. Referring to FIG. 3, the data driving IC 130-1 includes a clock generator 310, a sampler 320, a signal controller 330 and a data driver 340, and the data driver 340 includes a latch 341, a digital-to-analog converter (DAC) 342 and an output buffer 343. The other data driving ICs 130-2, . . . , 130-N also operate in the same way as the data driving IC 130-1.

The clock generator 310 generates a clock signal C_S from the reception signal R_S. The reception signal R_S includes the clock information CLK, the mode information DE, and the body BODY. As an example, when the clock information CLK is embedded with a different signal magnitude than the mode information DE and the body BODY as shown in FIG. 2(A), the clock generator 310 extracts the clock information CLK from the reception signal R_S using the magnitude of the reception signal R_S and generates the clock signal C_S. As another example, when the reception signal R_S has a periodic transition, the clock generator 310 may generate the clock signal C_S from the periodic transition of the reception signal R_S. The clock generator 310 may generate the clock signal C_S from the clock information CLK using a phase locked loop (PLL), delay locked loop (DLL). The clock signal C_S may have a frequency that is the same as or higher than the frequency of the clock information CLK.

The sampler 320 samples the mode information DE and the body BODY according to the clock signal C_S. The mode information DE indicates whether the body BODY is control information CTRL or data DATA. The control information CTRL corresponds to a control signal that controls the data driver 340, and the data DATA corresponds to R, G and B data values constituting an image. Since all of the mode information DE, the control information CTRL, and the data DATA are synchronized with the clock signal C_S, the sampler 320 can accurately sample the mode information DE, the control information CTRL, and the data DATA according to the clock signal C_S.

The signal controller 330 applies the data DATA sampled by the sampler 320 to the data driver 340. The signal controller 330 generates a control signal corresponding to the control information CTRL sampled by the sampler 320, and applies the control signal to the data driver 340. For example, the signal controller 330 generates the control signal that controls the data driver 340 on the basis of the sampled control information CTRL, and applies the generated control signal to the latch 341 or the DAC 342 included in the data driver 340. For example, the control information CTRL may include load signal information TP on a load signal TP_S and polarity signal information POL on a polarity control signal POL_S. In this case, the signal controller 330 generates and applies the load signal TP_S corresponding to the load signal information TP to the latch 341, and generates and applies the polarity control signal POL_S corresponding to the polarity signal information POL to the DAC 342.

The data driver 340 operates according to the control signal applied from the signal controller 330, and applies a data signal DATA_S corresponding to the data DATA to the display panel 140. The latch 341 latches the data DATA in sequence, and then outputs the data DATA to the DAC 342 in parallel according to the load signal TP_S applied from the signal controller 330. The DAC 342 converts the data DATA into the data signal DATA_S corresponding to a gamma voltage, and transfers the data signal DATA_S to the output buffer 343. In particular, the DAC 342 generates the data signal DATA_S corresponding to the data DATA with reference to one of a positive (+) gamma voltage and a negative (−) gamma voltage according to the polarity control signal POL_S applied from the signal controller 330. In this way, a data signal obtained by reflecting the positive (+) gamma voltage in a common voltage and a data signal obtained by reflecting the negative (−) gamma voltage in the common voltage are alternately supplied to the display panel 140, and thus an inversion operation is enabled. The output buffer 343 provides the data signal DATA_S transferred from the DAC 342 to the respective data lines of the display panel 140.

Figure 4:
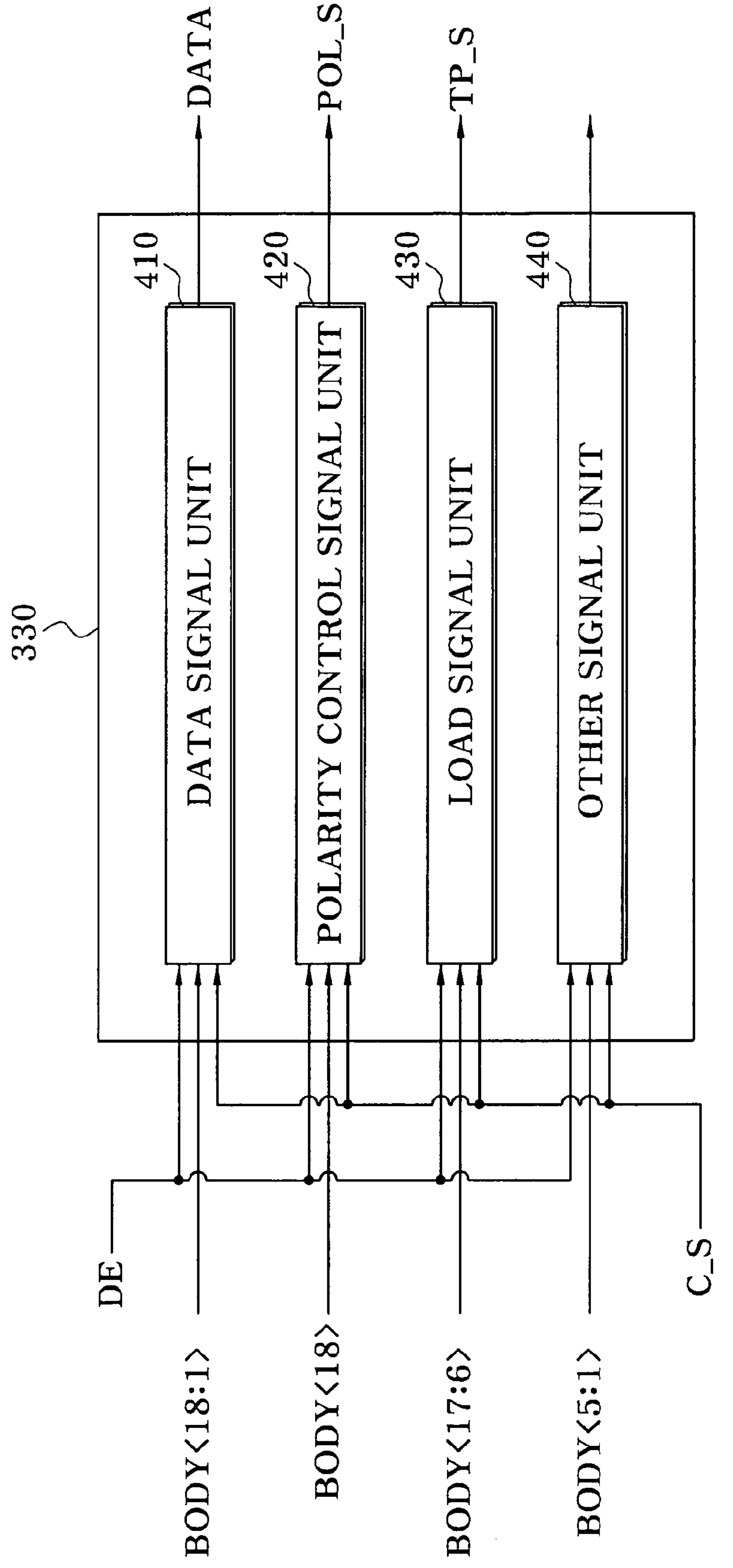
FIG. 4 is a block diagram of an example of a signal controller shown in FIG. 3.

FIG. 4 is a block diagram of an example of the signal controller 330 shown in FIG. 3. Referring to FIG. 4, the signal controller 330 includes a data unit 410, a polarity control signal unit 420, a load signal unit 430, and an other signal unit 440. The signal controller 330 receives a signal including the mode information DE and the body BODY<18:1> of the reception signal R_S shown in FIG. 2(A) except the clock information CLK.

The data unit 410 operates when the mode information DE is “1,” and provides the 18-bit body BODY<18:1> to the latch 341 as the data DATA.

The polarity control signal unit 420 operates when the mode information DE is “0.” The polarity control signal unit 420 generates and applies the low polarity control signal POL_S to the DAC 342 when a 1-bit body BODY<18> is “0,” and generates and applies the high polarity control signal POL_S to the DAC 342 when the 1-bit body BODY<18> is “1.”

The load signal unit 430 operates when the mode information DE is “0,” and generates and applies the load signal TP_S corresponding to a 12-bit body BODY<17:6> to the latch 341.

The other signal unit 440 operates when the mode information DE is “0,” and generates and applies control signals corresponding to other control signal information to the data driver 340.

Figure 5:
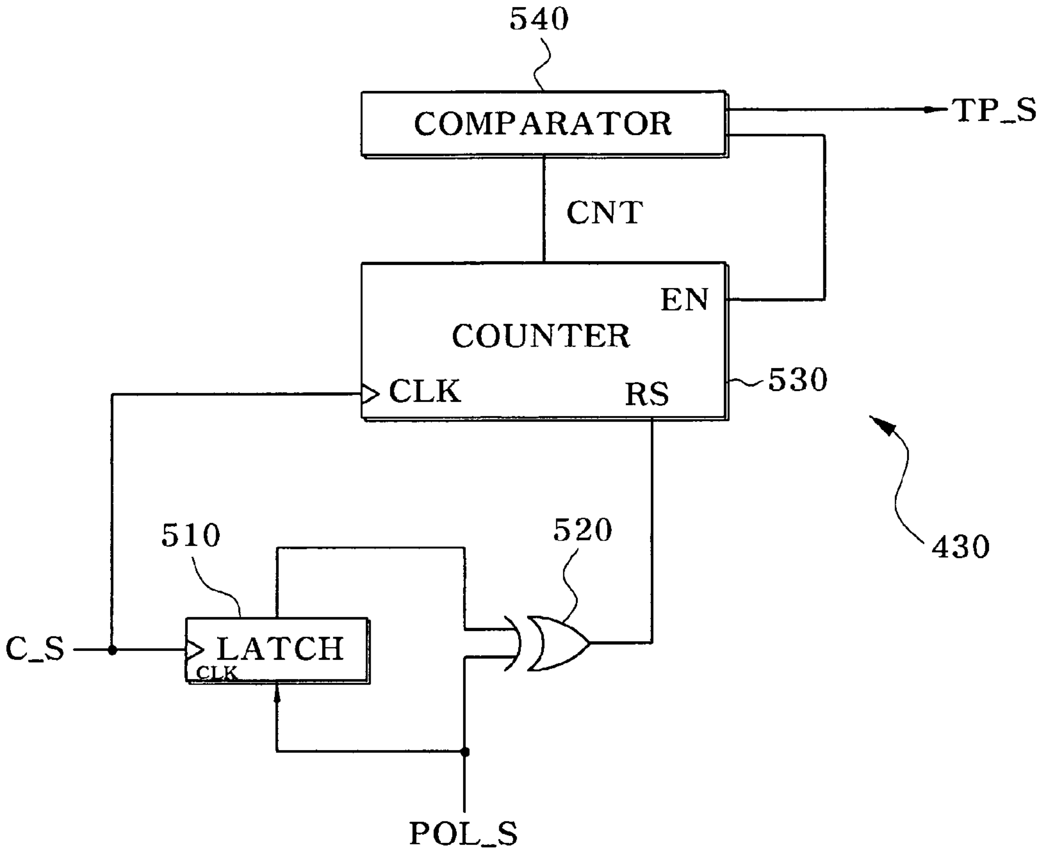
FIG. 5 is a block diagram of an example of a load signal unit shown in FIG. 4.

FIG. 5 is a block diagram of an example of the load signal unit 430 shown in FIG. 4. Referring to FIG. 5, the load signal unit 430 includes a latch 510, an XOR gate 520, a counter 530, and a comparator 540.

The latch 510 receives the polarity control signal POL_S and outputs a polarity control signal that is the received polarity control signal POL_S delayed for one clock. The XOR gate 520 receives the polarity control signal POL_S and the polarity control signal delayed for one clock. The XOR gate 520 outputs a reset signal “1” in a section in which the polarity control signal POL_S rises from low to high or falls from high to low, and outputs a reset signal “0” in other sections. The counter 530 receives the clock signal C_S from the clock generator 310, the reset signal from the XOR gate 520 through a reset terminal RS. The counter 530 performs a reset operation when “1” is input to the reset terminal RS, and stops a counting operation when “0” is input. The counter 530 performs the counting operation when an enable signal “1” is input to the enable terminal EN, and outputs a count number CNT to the comparator 540. The comparator 540 compares the count number CNT input from the counter 530 with a 12-bit body BODY<17:6>, and generates the high or low load signal TP_S according to the comparison result. For example, the comparator 540 generates the high load signal TP_S in a case where the count number CNT is equal to or larger than TL<6:1> and smaller than a value obtained by adding TH<6:1> to TL<6:1>, and generates the low load signal TP_S in other cases. In this way, the comparator 540 activates the load signal TP_S when a clock indicated by TL<6:1> elapses after the polarity control signal POL_S varies, and deactivates the load signal TP_S when a clock indicated by TH<6:1> elapses after the load signal TP_S is activated. The comparator 540 outputs an enable signal “0” to the enable terminal EN of the counter 530 in a case where the count number CNT is equal to or larger than the value obtained by adding TH<6:1> to TL<6:1>, and outputs an enable signal “1” to the enable terminal EN of the counter 530 in other cases.

Figure 6:
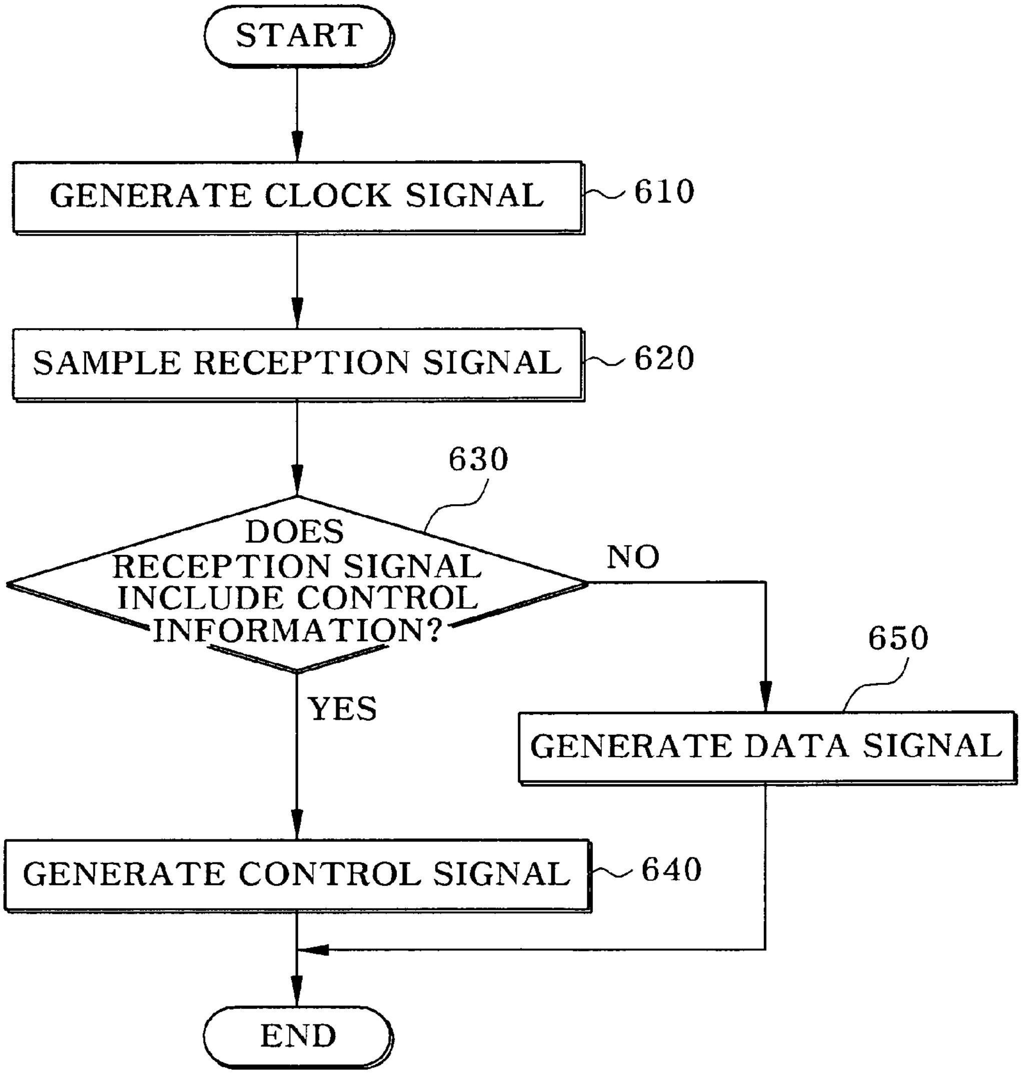
FIG. 6 is a flowchart illustrating operation of a data driving IC according to an embodiment of the present disclosure.

FIG. 6 is a flowchart illustrating operation of a data driving IC according to an embodiment of the present disclosure. Referring to FIG. 6, the operation of a data driving IC according to an embodiment of the present disclosure includes operations processed by the data driving IC shown in FIG. 3 according to the time flow. Thus, the above description regarding the data driving IC shown in FIG. 3 is also applied to a display method according to this embodiment even if the description is not reiterated below.

Referring to FIG. 6, the data driving IC generates a clock signal C_S from the reception signal R_S in operation 610. As shown in FIG. 2(A), the reception signal R_S includes clock information CLK, mode information DE, and a body BODY, which is one of data DATA and control information CTRL. As an example, when the clock information CLK is embedded with a different signal magnitude than the mode information DE and the body BODY, the data driving IC extracts the clock information CLK from the reception signal R_S using the magnitude of the reception signal R_S and generates the clock signal C_S. As another example, when the reception signal R_S has a periodic transition, the data driving IC generates the clock signal C_S from the periodic transition of the reception signal R_S.

In operation 620, the data driving IC samples the mode information DE and the body BODY from the reception signal R_S according to the clock signal C_S. The mode information DE indicates whether the body BODY is control information CTRL or data DATA. The body BODY corresponds to the reception signal R_S excluding the mode information DE. The control information CTRL corresponds to a control signal that controls the data driver 340, and the data DATA is R, G and B data values constituting an image.

In operation 630, the data driving IC determines whether the reception signal R_S includes data DATA or control information CTRL with reference to the mode information DE. For example, the data driving IC determines the body BODY as data DATA when the mode information DE is “1,” and as control information CTRL when the mode information DE is “0.”

When it is determined in operation 630 that the reception signal R_S includes control information CTRL, the data driving IC generates a control signal corresponding to the control information CTRL in operation 640. At this time, the data driving IC generates a load signal TP_S corresponding to load signal information TP and a polarity control signal POL_S corresponding to polarity signal information POL.

When it is determined in operation 630 that the reception signal R_S includes data DATA, the data driving IC generates and applies a data signal DATA_S corresponding to the data DATA to a display panel in operation 650.

As described above, a data driving circuit and a data driving method according to embodiments of the present disclosure receive a reception signal including clock information, control information and data, generate a clock signal and a control signal from the reception signal, and process the data. Thus, a line for transferring the control signal or clock signal to the data driving circuit is not required, and the number of signal lines can be reduced.

Since the data driving circuit, the display device and the data driving circuit do not require a clock line or control line, an electromagnetic interference (EMI) component caused by the clock line or control line can be removed.

An embodiment of the present disclosure can be implemented as machine readable codes in a machine readable recording medium. The computer readable recording medium includes all types of recording media in which machine readable data are stored. Examples of the machine readable recording medium include a ROM, a RAM, a CD-ROM, a magnetic tape, a floppy disk, and an optical data storage. In addition, the machine readable recording medium may be distributed to several machines over a network, in which machine readable codes may be stored and executed in a distributed manner. A functional program, code, and code segments for implementing an embodiment of the present disclosure can be readily deduced by programmers in the technical field of the present disclosure.

The foregoing is illustrative of the present disclosure and is not to be construed as limiting thereof. Although numerous embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A data driving circuit, comprising:

a clock generator configured to generate a clock signal from clock information included in a reception signal including the clock information, mode information and a body;

a sampler configured to sample the reception signal according to the clock signal to obtain the mode information and the body that includes at least one of control information and data;

a signal controller configured to determine whether or not the body corresponds to the control information with reference to the mode information, and generate a control signal corresponding to the control information according to a result of the determination; and a data driver configured to generate a data signal corresponding to the data according to the control signal, wherein the mode information is embedded with the clock information and the body, and the mode information is transmitted via a same line with the clock information and the body.

2. The data driving circuit according to claim 1, wherein the control information includes information on a polarity control signal and information on a load signal.

3. The data driving circuit according to claim 2, wherein the signal controller includes:

a polarity control signal unit configured to generate the polarity control signal corresponding the information on the polarity control signal; and a load signal unit configured to generate the load signal enabled in a section corresponding to the information on the load signal.

4. A data driving method, comprising:

generating a clock signal from clock information included in a reception signal including the clock information, mode information and a body;

sampling the reception signal according to the clock signal and obtaining the mode information and the body that includes at least one of control information and data;

determining whether or not the body corresponds to the control information with reference to the mode information;

generating a control signal corresponding to the control information according to a result of the determination; and generating a data signal corresponding to the data according to the control signal, wherein the mode information is embedded with the clock information and the body, and the mode information is transmitted via a same line with the clock information and the body.

5. The data driving method according to claim 4, wherein the control information includes at least one of information on a polarity control signal and information on a load signal.

6. The data driving method according to claim 5, wherein generating the control signal includes:

generating the polarity control signal corresponding to the information on the polarity control signal; and generating the load signal enabled in a section corresponding to the information on the load signal.

7. A display device, comprising:

a timing controller configured to generate a reception signal including clock information, a body and mode information, the mode information indicating whether the body includes control information or data;

a data driving circuit configured to generate a control signal corresponding to the control information included in the reception signal with reference to the mode information included in the reception signal, and generate a data signal corresponding to the data included in the reception signal according to the control signal; and a display panel configured to display an image corresponding to the data signal, wherein the mode information is embedded with the clock information and the body, and the mode information is transmitted via a same line with the clock information and the body.

8. The display device according to claim 7, wherein the control information includes at least one of information on a polarity control signal and information on a load signal.

9. The display device according to claim 7, wherein a clock signal from the clock information is used to sample the data, the control information and the mode information.

* * * * *